United States Patent
Jung et al.

(10) Patent No.: US 12,126,929 B2
(45) Date of Patent: Oct. 22, 2024

(54) ELECTRONIC DEVICE APPLYING BOKEH EFFECT TO IMAGE AND OPERATING METHOD THEREOF

(71) Applicant: Samsung Electronics Co., Ltd., Gyeonggi-do (KR)

(72) Inventors: Kioh Jung, Gyeonggi-do (KR);
Seunghan Lee, Gyeonggi-do (KR);
Cheolhee Choi, Gyeonggi-do (KR);
Soonkyoung Choi, Gyeonggi-do (KR);
Dongyoul Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/109,960

(22) Filed: Feb. 15, 2023

(65) Prior Publication Data

US 2023/0199134 A1    Jun. 22, 2023

Related U.S. Application Data

(63) Continuation of application No. PCT/KR2022/013532, filed on Sep. 8, 2022.

(30) Foreign Application Priority Data

Sep. 14, 2021    (KR) .................. 10-2021-0122554

(51) Int. Cl.
*H04N 5/262* (2006.01)
*H04N 23/67* (2023.01)
(Continued)

(52) U.S. Cl.
CPC ......... *H04N 5/2621* (2013.01); *H04N 5/2628* (2013.01); *H04N 23/675* (2023.01);
(Continued)

(58) Field of Classification Search
CPC .. H04N 5/2621; H04N 5/2628; H04N 23/675; H04N 23/6812; H04N 23/687;
(Continued)

(56) References Cited

U.S. PATENT DOCUMENTS 10,313,654 B1    6/2019  Yu
10,554,898 B2    2/2020  Ouyang et al.
(Continued)

FOREIGN PATENT DOCUMENTS

CN    107113420 A    8/2017
CN    111246089 A    6/2020
(Continued)

OTHER PUBLICATIONS

Extended European Search Report dated Jul. 18, 2024.

*Primary Examiner* — Padma Haliyur
(74) *Attorney, Agent, or Firm* — Cha & Reiter, LLC

(57) ABSTRACT

According to certain embodiments, an electronic device comprises: a motion sensor; a first camera module including a lens assembly and a driving circuit configured to move the lens assembly in a direction substantially perpendicular to an optical axis, the first camera module having a first angle of view when the lens assembly is positioned in a reference position; a second camera module having a second angle of view, wherein the first angle of view is entirely in the second angle of view; and at least one processor electrically connected to the motion sensor, the first camera module, and the second camera module, wherein the at least one processor is configured to: control the driving circuit to move the lens assembly based on motion data received from the motion sensor, thereby causing the first camera module to have a third angle of view, offset from the first angle of view by an angle, acquire, from the first camera module, a first image corresponding to the third angle of view, acquire a second image corresponding to the second angle of view from the
(Continued)

second camera module, acquire depth information for the first image based on the second image and the motion data, and apply a bokeh effect to the first image based on the depth information.

20 Claims, 8 Drawing Sheets

(51) Int. Cl.
    *H04N 23/68*     (2023.01)
    *H04N 23/69*     (2023.01)

(52) U.S. Cl.
    CPC ....... *H04N 23/6812* (2023.01); *H04N 23/687* (2023.01); *H04N 23/69* (2023.01)

(58) Field of Classification Search
    CPC .... H04N 23/69; H04N 23/958; H04N 5/2226; H04N 13/271; H04N 23/90; G06T 5/20
    See application file for complete search history.

(56) References Cited

U.S. PATENT DOCUMENTS

| | | |
|---|---|---|
| 10,764,504 B2 | 9/2020 | Baek et al. |
| 11,368,620 B2 | 6/2022 | Hashizume et al. |
| 11,461,910 B2 | 10/2022 | Kim et al. |
| 2013/0135439 A1 | 5/2013 | Kakuko et al. |
| 2013/0258044 A1 | 10/2013 | Betts-Lacroix |
| 2016/0182887 A1 | 6/2016 | Gutierrez |
| 2016/0337601 A1* | 11/2016 | Lee ...................... H04N 13/271 |
| 2017/0126978 A1 | 5/2017 | Yun |
| 2017/0358101 A1 | 12/2017 | Bishop et al. |
| 2019/0028646 A1 | 1/2019 | Wang et al. |
| 2019/0244377 A1 | 8/2019 | Yu |
| 2020/0051265 A1 | 2/2020 | Kim et al. |
| 2020/0394770 A1* | 12/2020 | Roulet ...................... G06T 7/50 |
| 2021/0211636 A1* | 7/2021 | Lee ...................... H04N 7/141 |
| 2022/0217278 A1 | 7/2022 | Oh |

FOREIGN PATENT DOCUMENTS

| | | |
|---|---|---|
| CN | 108260360 B | 1/2021 |
| EP | 3448011 A1 | 2/2019 |
| JP | 2016-119724 A | 6/2016 |
| KR | 10-2016-0093299 A | 8/2016 |
| KR | 10-2017-0030946 A | 3/2017 |
| KR | 10-2017-0050912 A | 5/2017 |
| KR | 10-2018-0117597 A | 10/2018 |
| KR | 10-2019-0021725 A | 3/2019 |
| KR | 10-2020-0017172 A | 2/2020 |
| KR | 10-2020-0041382 A | 4/2020 |
| KR | 10-2020-0122013 A | 10/2020 |

\* cited by examiner

ELECTRONIC DEVICE APPLYING BOKEH EFFECT TO IMAGE AND OPERATING METHOD THEREOF

CLAIM OF PRIORITY

This application is a Bypass continuation application of International Application No. PCT/KR2022/013532 designating the United States, filed on Sep. 8, 2022, in the Korean Intellectual Property Receiving Office and claiming priority under 35 U.S.C. 119 to Korean Patent Application No. 10-2021-0122554, filed Sep. 14, 2021 in the Korean Intellectual Property Office, the contents of which are incorporated herein, by reference, for all purposes.

BACKGROUND

1. Technical Field

The disclosure relates to a technology for applying a bokeh effect to an image by using a camera provided in an electronic device.

2. Description of Related Art

Recent diversification of mobile device functions has increased demands for improved image capture functions using mobile devices. Accordingly, mobile devices perform various image capture functions.

Mobile devices not only generate captured images of subjects, but also provide various image effects. For example, mobile devices apply a bokeh effect or out-focusing effect to images. The bokeh effect refers to an effect obtained by making the subject clear and backgrounds other than the subject blurred by out-focusing the same, and the bokeh effect can also be applied through image processing.

Optical images stabilization can be used to reduce vibration by moving an image sensor or a lens assembly included in a camera module. Video digital image stabilization (VDIS) can reduce vibration through digital processing.

Application of the bokeh effect may not be optical because the effect may be applied without taking OIS into account. That is, when the image processing device has moved the lens assembly during OIS, the performance of the bokeh effect may be degraded because the bokeh effect has been applied without considering the amount of movement of the lens assembly.

According to certain embodiments disclosed herein, an electronic device may provide the bokeh effect by using motion data acquired from a motion sensor.

According to certain embodiments disclosed herein, an electronic device may compensate for a variation in the field of view of a camera module caused by an OIS operation, thereby providing the bokeh effect and a depth map with improved accuracy.

Problems to be solved by the disclosure are not limited to the above-mentioned problems, and may be variously expanded without deviating from the idea and scope of the disclosure.

SUMMARY

According to certain embodiments, an electronic device comprises: a motion sensor; a first camera module including a lens assembly and a driving circuit configured to move the lens assembly in a direction substantially perpendicular to an optical axis, the first camera module having a first angle of view when the lens assembly is positioned in a reference position; a second camera module having a second angle of view, wherein the first angle of view is entirely in the second angle of view; and at least one processor electrically connected to the motion sensor, the first camera module, and the second camera module, wherein the at least one processor is configured to: control the driving circuit to move the lens assembly based on motion data received from the motion sensor, thereby causing the first camera module to have a third angle of view, offset from the first angle of view by an angle, acquire, from the first camera module, a first image corresponding to the third angle of view, acquire a second image corresponding to the second angle of view from the second camera module, acquire depth information for the first image based on the second image and the motion data, and apply a bokeh effect to the first image based on the depth information.

According to certain embodiments, a method of operating an electronic device, the method comprises: moving a lens assembly included in a first camera module in a direction substantially perpendicular to an optical axis based on motion data from a motion sensor, thereby causing the first camera module to offset from having a first angle of view by angle to a third angle of view; acquiring a first image corresponding to a third angle of view; acquiring a second image corresponding to a second angle of view, wherein the first angle of view is entirely within the second angle of view, through a second camera module; acquiring depth information for the first image based on the second image and the motion data; and applying a bokeh effect to the first image based on the depth information.

According to certain embodiment, an electronic device comprises: a motion sensor; a first camera module including a lens assembly and a driving circuit configured to move the lens assembly in a direction substantially perpendicular to an optical axis and to have a first angle of view when the lens assembly is positioned in a reference position; a second camera module having a second angle of view wider than or equal to the first angle of view; and at least one processor electrically connected to the motion sensor, the first camera module, and the second camera module, wherein the at least one processor is configured to: control the driving circuit to move the lens assembly based on motion data from the motion sensor, acquire, from the first camera module, a first image corresponding to a third angle of view moved by an angle from the first angle of view, acquire a second image corresponding to the second angle of view from the second camera module, determine a partial area of the second image satisfying a designated condition based on the motion data, acquire depth information corresponding to a depth of points included in the first image based on the partial area of the second image and the first image, and applying a bokeh effect to the first image based on the depth information.

BRIEF DESCRIPTION OF THE DRAWINGS

In connection with the description of the drawings, the same or similar reference numerals may be used for the same or similar components.

DETAILED DESCRIPTION

According to certain embodiments disclosed herein, the performance of a bokeh effect may be improved when an electronic device performs image processing so as to apply the bokeh effect to images.

According to certain embodiments disclosed herein, an electronic device may apply the bokeh effect by using motion data acquired from a motion sensor such that, compared with a case in which the bokeh effect is applied by measuring the amount of actual movement of a lens assembly, the data transmission path is simplified, the data processing rate is improved, and the latency is reduced.

According to certain embodiments disclosed herein, an electronic device may compensate for a variation in the field of view of a camera module caused by an OIS operation, thereby acquiring a depth map with improved accuracy and improving the performance of the bokeh effect.

Advantageous effects obtainable from the disclosure are not limited to the above-mentioned advantageous effects, and other advantageous effects not mentioned herein will be clearly understood from the following description by those skilled in the art to which the disclosure pertains.

Hereinafter, certain embodiments will be described with reference to the accompanying drawings. However, this is not intended to limit the specific embodiments, and it should be understood that various modifications, equivalents, and/or alternatives of the embodiments are included.

Figure 1:
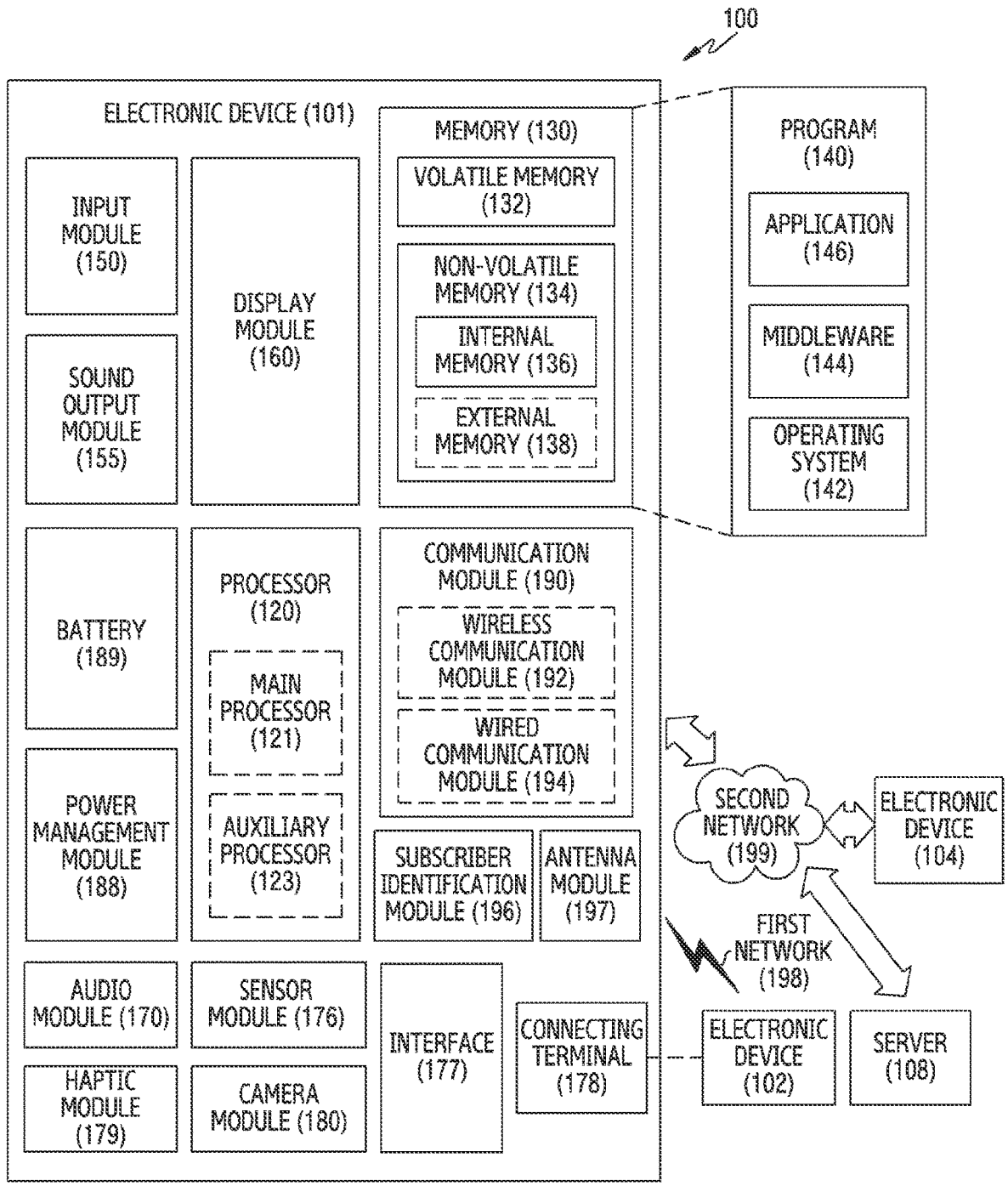
FIG. 1 is a block diagram illustrating an electronic device in a network environment according to certain embodiments.
Figure 5:
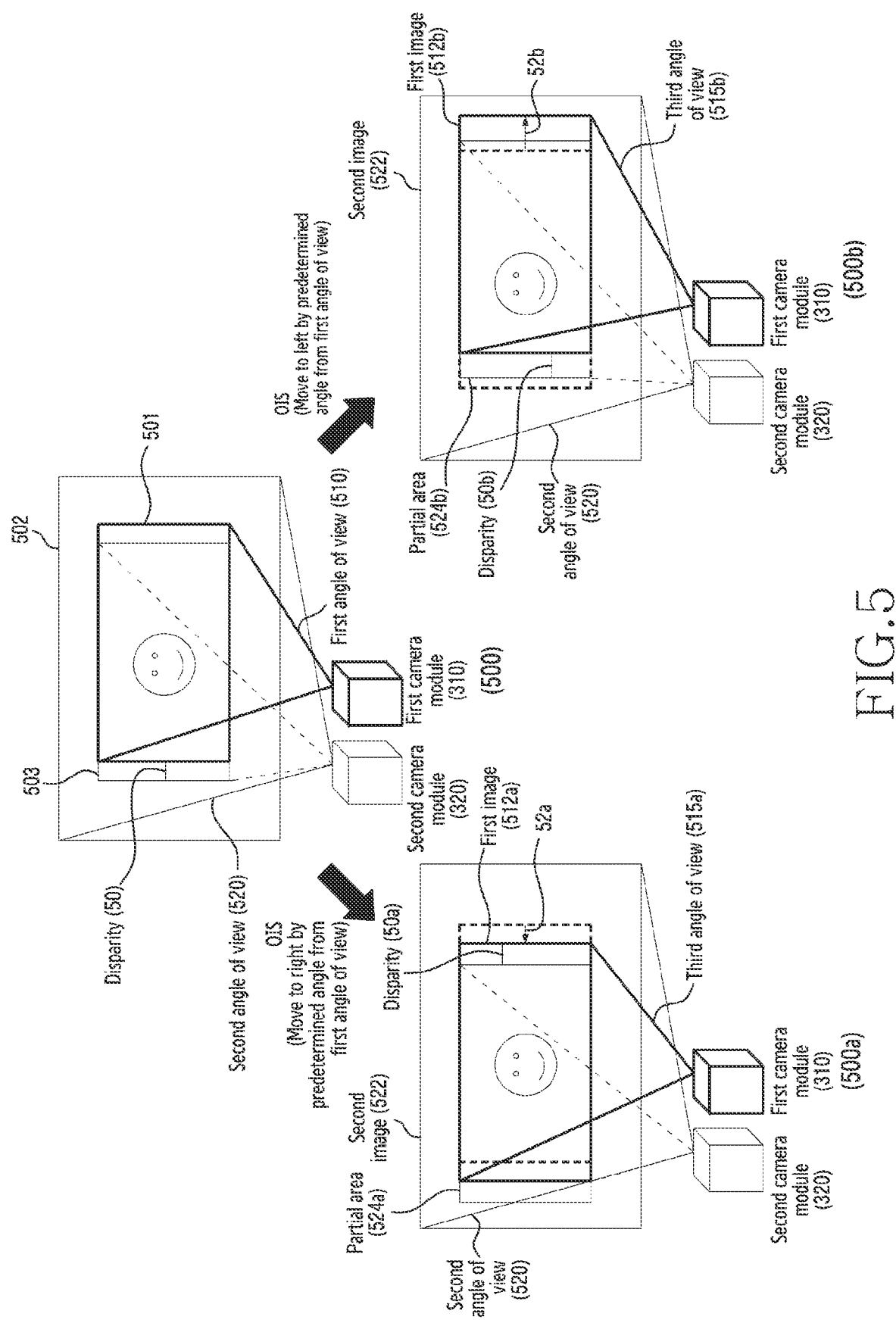
FIG. 5 is a diagram illustrating an example in which an electronic device determines a partial area of a second image based on motion data according to an embodiment.
Figure 6:
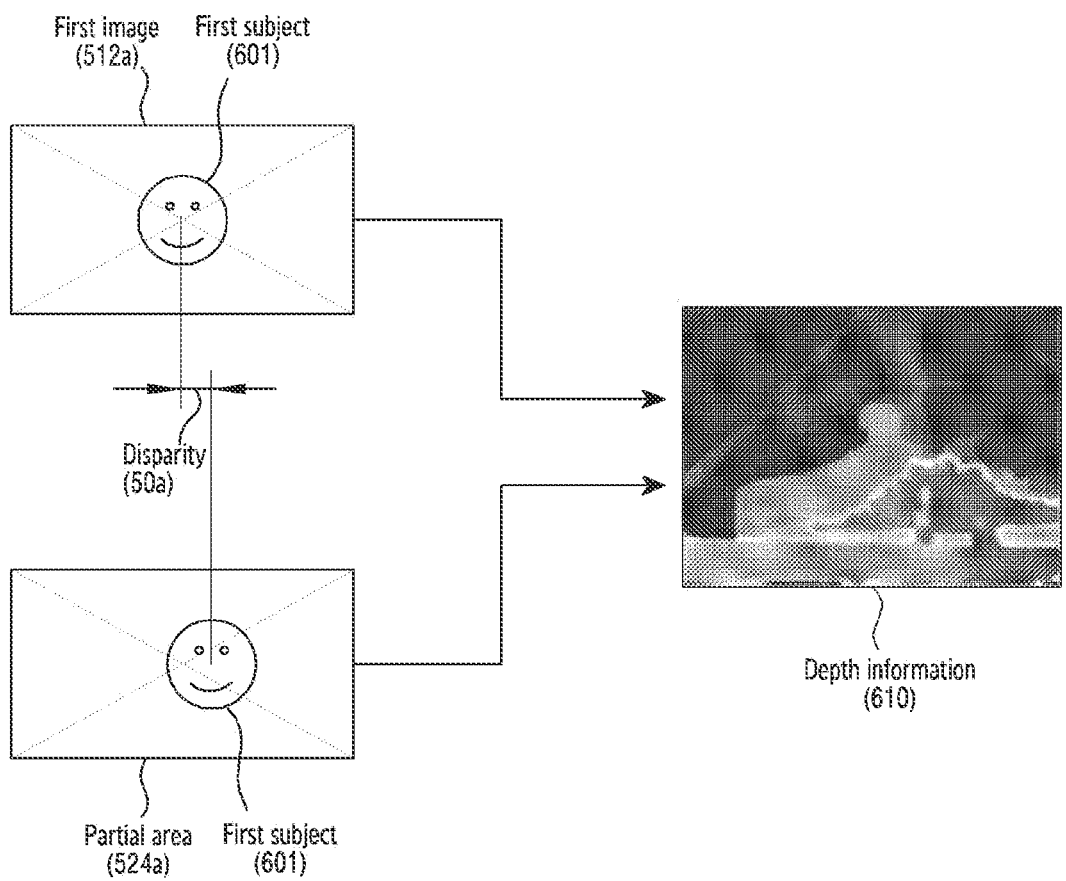
FIG. 6 is a diagram illustrating an example in which an electronic device acquires depth information based on a first image and a partial area of a second image according to an embodiment.

This disclosure will start with the description of an electronic device 101 where certain embodiments of the disclosure can be practiced (FIG. 1). The electronic device 101 may include a plurality of camera modules 180. The camera modules 180 are described in more detail in FIG. 2. FIG. 3 describes an electronic device with a first camera module and a second camera module, a motion sensor for OIS, and modules for depth measurement and bokeh application. FIG. 5 describes the use of a motion sensor and a driving circuit to generate a first image that is stabilized with OIS, and capture a second image that has an angle that fully includes the angle of the first image. As shown in FIG. 6, the first image and the second image are used to generate a depth map for the first image. The bokeh effect can then be applied to the first image, thereby resulting in an image with OIS and the bokeh effect, where the bokeh effect takes into consideration the OIS.

Electronic Device

FIG. 1 describes an electronic device. The electronic device includes at least one camera 180. The at least one camera 180 may provide stable images with improved bokeh affect.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a plurality of camera modules 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the plurality of camera modules 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The term "processor" as used in this disclosure shall be understood to refer to both the singular and plural contexts.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the plurality of camera modules 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The plurality of camera modules 180 may capture a still image or moving images. According to an embodiment, the at least one camera module 180 may include one or more lenses, image sensors, image signal processors, or flashes. Each of the plurality of camera modules 180 can include a lens assembly and a driving circuit. A camera module 180 will be described in more detail in FIG. 2.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

The antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The electronic device 101 may include a plurality of camera modules. The camera module 180 will be described in more detail in FIG. 2. One of the modules (a first module) can be used to generate an image with OIS. Another module (a second module) can be used to generate an image from a known angle of view and position with respect to the first camera module. Since the second image will include a pixel that corresponds to every pixel in the first image, with information from a motion sensor, a depth map for the first image can be generated. The depth map can be used for application of the bokeh effect.

Camera Module

A camera module 180 can be used to capture an image or a scene from the vantage of the electronic device 101. The lens assembly 210 focuses light onto an image sensor 230. The image stabilizer 240 stabilizes the images when the user is holding the electronic device. That is, the user's hand may shake. Accordingly, the image stabilizer may include a driving circuit that is configured to move the lens assembly in a direction substantially perpendicular to an optical axis to compensate.

Figure 2:
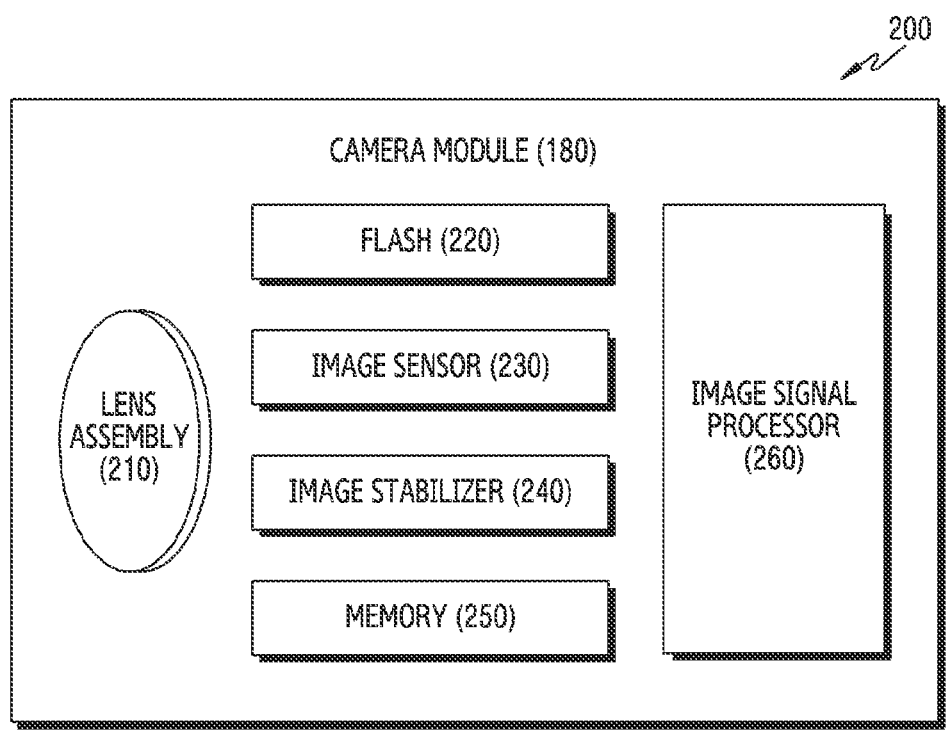
FIG. 2 is a block diagram illustrating the camera module according to certain embodiments.
Figure 3:
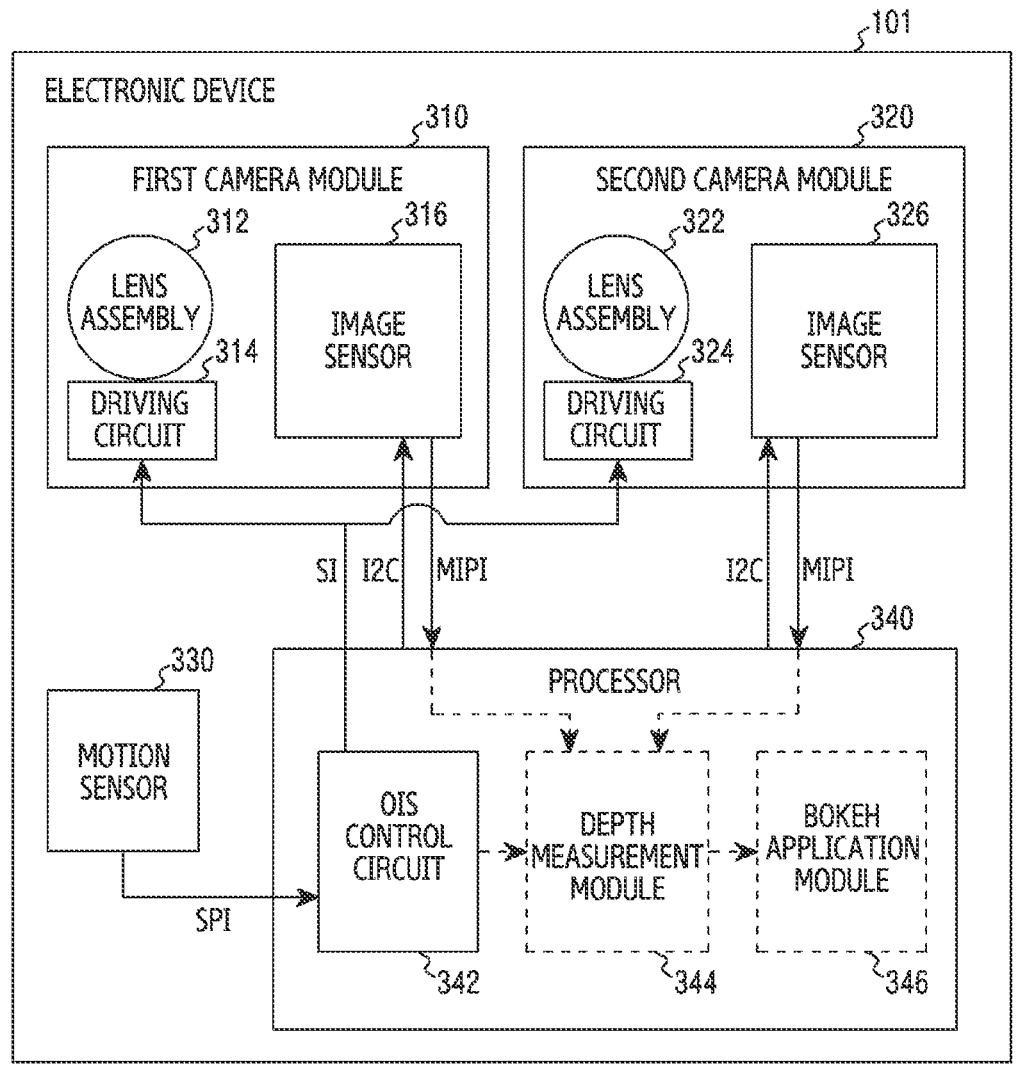
FIG. 3 is a block diagram illustrating a configuration of an electronic device in which a bokeh effect can be applied according to an embodiment.

FIG. 2 is a block diagram 200 illustrating the camera module 180 according to certain embodiments. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer (OIS). The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

The electronic device 101 can apply a number of affects to pictures that are captured by the plurality of camera modules 180. For example, the bokeh effect refers to an effect obtained by making the subject clear and backgrounds other than the subject blurred by out-focusing the same, and the bokeh effect can also be applied through image processing.

FIG. 3 is a block diagram illustrating a configuration of an electronic device 101 in which a bokeh effect can be applied according to an embodiment.

The electronic device 101 includes a motion sensor 330 that provides data corresponding to the movement of the electronic device 101 to the processor 340. Based on the data provided from the motion sensor, processor 340 controls a driving circuit 314 of a first camera module 310 to move lens assembly 312 of the first camera module. The foregoing provides image stability. The processor uses an image of the second camera module 320 to correct a difference in the angle of view from the first camera module due to movement of the lens assembly. From the corrected image of the first module 310, the processor can acquire depth information using a Depth Measurement Module 344 and apply the bokeh affect with a Bokeh application module 346.

The electronic device 101 of FIG. 3 may include a first camera module 310, a second camera module 320, a motion sensor 330, and a processor 340. The first camera module 310 and the second camera module 320 may each correspond to the camera module 180 of FIG. 2. The motion sensor 330 may be included in the sensor module 176 of FIG. 1. The processor 340 may correspond to the processor 120 of FIG. 1.

The electronic device 101 may detect the movement of the electronic device 101 through the motion sensor 330. The motion sensor 330 may provide motion data corresponding to the movement of the electronic device 101 to the processor 340. For example, the motion sensor 330 may provide motion data to an OIS control circuit 342 through an interface (e.g., a serial peripheral interface {SPI}).

The motion sensor 330 may include an acceleration sensor, a gyro sensor (gyroscope), a magnetic sensor, or a Hall sensor. For example, the acceleration sensor may measure an acceleration acting in three axes (e.g., an x-axis, a y-axis, or a z-axis) of the electronic device 101. The processor 340 may measure, estimate, and/or detect a force applied to the electronic device 101 using the acceleration measured by the acceleration sensor. However, the above sensors are exemplary, and the motion sensor 330 may further include at least one other type of sensor.

The first camera module 310 may include a lens assembly 312, a driving circuit 314, and an image sensor 316. The lens assembly 312 may correspond to the lens assembly 210 of FIG. 2, and the image sensor 316 may correspond to the image sensor 230 of FIG. 2. The lens assembly 312 may include at least one lens aligned along an optical axis.

The second camera module 320 may include a lens assembly 322, a driving circuit 324, and an image sensor 326. The lens assembly 322 may correspond to the lens assembly 210 of FIG. 2, and the image sensor 326 may correspond to the image sensor 230 of FIG. 2. The lens assembly 322 may include at least one lens aligned along an optical axis. The number, arrangement, or type of lenses included in the lens assembly 322 may be different from that of the lens assembly 312.

The driving circuit 314 may move the lens assembly 312 in an optical axis direction and/or in a direction substantially perpendicular to the optical axis. For example, the processor 340 may perform optical image stabilization (OIS) by controlling the driving circuit 314 to move the lens assembly 312 in the direction substantially perpendicular to the optical axis. As another example, the processor 340 may perform auto focus (AF) by controlling the driving circuit 314 to move the lens assembly 312 in the optical axis direction. The driving circuit 314 may perform OIS or AF using at least one coil and magnet included in the first camera module 310. The driving circuit 314 may include an OIS module for performing OIS and an AF module for performing AF. The driving circuit 314 may include a first OIS module for performing OIS in the x-axis direction, a second OIS module for performing OIS in the y-axis direction, and an AF module for performing AF by moving the lens assembly 312 in the z-axis direction, which is the optical axis direction. The driving circuit 314 may further include a Hall sensor capable of confirming the position of the lens assembly 312. For example, the OIS module and the AF module may each acquire position information on the position of the lens assembly 312 through the Hall sensor. The description of the driving circuit 314 included in the first camera module 310 may also be applied to the driving circuit 324 included in the second camera module 320.

The image sensor 316 may be a complementary metal oxide semiconductor (CMOS) sensor. A plurality of individual pixels may be integrated in the image sensor 316, and each of the individual pixels may include a micro lens, a color filter, and a photodiode. Each individual pixel may convert light input through the lens assembly 312 into an electrical signal. The image sensor 316 may amplify a current generated by light received through the lens assembly 312 through the photoelectric effect of a light receiving element. For example, an individual pixel may include a photoelectric transformation element (or a position sensitive detector {PSD}) and a plurality of transistors (e.g., a reset transistor, a transmission transistor, a selection transistor, a driver transistor, etc.). The image sensor 316 may provide image data obtained by converting light information of a subject incident through the lens assembly 312 into an electrical signal, to the processor 340. The description of the image sensor 316 included in the first camera module 310 may also be applied to the image sensor 326 included in the second camera module 320.

The angle of view of the first camera module 310 may be different from that of the second camera module 320. The first camera module 310 may have a first angle of view, and the second camera module 320 may have a second angle of view. In an embodiment, the second angle of view may include the first angle of view. That is, the entire first angle of view can be within the second angle of view. For example, the second angle of view may be wider than the first angle of view. For example, the first camera module 310 may be a wide camera, and the second camera module 320 may be an ultra-wide camera. As another example, the first camera module 310 may be a tele camera, and the second camera module 320 may be a wide camera. The first camera module 310 may acquire a first image corresponding to the first angle of view, and the second camera module 320 may acquire a second image corresponding to the second angle of view. An area corresponding to the first image may be included in an area corresponding to the second image. For example, all subjects included in the first image may be included in the second image, and some of subjects included in the second image may not be included in the first image.

As the first camera module 310 performs OIS, the angle of view of the first camera module 310 may be changed. When the lens assembly 312 of the first camera module 310 is positioned at a reference position, the angle of view of the first camera module 310 will be referred to as the first angle of view. When the lens assembly 312 is moved in the direction substantially perpendicular to the optical axis as the OIS is performed, the angle of view of the first camera module 310 will be referred to as a third angle of view moved by an angle from the first angle of view. For example, the third angle of view may be an angle of view moved by about 1.5 degrees to the right (e.g., in the +x-axis direction) from the first angle of view.

The first camera module 310 (or the second camera module 320) may provide the first image (or the second image) acquired through the image sensor 316 (or the image sensor 326) to the processor 340. For example, the image sensor 316 may transmit image data corresponding to the first image (or the second image) to the processor 340 through an interface (e.g., a mobile industry processor interface {MIDI}) connected to the processor 340.

The processor 340 may be understood to include at least one processor. For example, the processor 340 may include at least one of an application processor (AP), an image signal processor (ISP), a communication processor (CP), and an OIS control circuit 342. The ISP may correspond to the image signal processor 260 of FIG. 2. The OIS control circuit 342 may be a component disposed separately from the AP, or may be a component to be included in the AP. The processor 340 may further include a depth measurement module 344 and a bokeh application module 346. For example, the depth measurement module 344 and the bokeh application module 346 may be hardware modules disposed inside the AP, or may be software modules that may be executed in the AP.

The processor 340 may acquire motion data corresponding to the movement of the electronic device 101 from the motion sensor 330. For example, the OIS control circuit 342 may acquire motion data corresponding to the movement of the electronic device 101 from the motion sensor 330. The processor 340 may control the first camera module 310 (or the second camera module 320) to perform OIS based on the motion data acquired from the motion sensor 330. For example, the processor 340 (e.g., the OIS control circuit 342) may control the driving circuit 314 (or the driving circuit 324) to move the lens assembly 312 (or the lens assembly 322) based on the motion data acquired from the motion sensor 330. The processor 340 may control the driving circuit 314 (or the driving circuit 324) through an interface (e.g., a serial interface {SI}).

The processor 340 may control the image sensors 316 and 326. For example, the processor 340 may transmit an image command to the image sensors 316 and 326 through an interface (e.g., an inter-integrated circuit {I2C}), and may acquire image data from the image sensors 316 and 326 through another interface (e.g., MIPI).

The processor 340 may acquire depth information corresponding to the depth of points included in the first image based on the motion data acquired from the motion sensor 330, the first image acquired from the image sensor 316 of the first camera module 310, and the second image acquired from the image sensor 326 of the second camera module 320.

Using with the first angle, and the motion data acquired form the motion sensor, the relative differences in vantage point of the first camera module 310, the third angle of view can be determined. From the first image and the second image, depth information can be determined. The depth information can be determined by matching pixels in the first and second image that correspond to the same point in the scene that was photographed. With the foregoing information, the first angel of view, and the third angle of view, and the relative locations of the first camera module and the second module, a depth map can be generated, indicating the depth of each pixel in the first image. Moreover, since the first image has undergone OIS, application of the bokeh affect using the depth information provides an image that is stabilized using OIS, and wherein the bokeh affect has been applied, taking into consideration stabilization due to OIS.

For example, the depth measurement module 344 may acquire a depth map by using the motion data, the first image, and the second image. The acquisition of the depth information will be described later with reference to FIGS. 5 to 7.

The processor 340 may acquire a composite image obtained by applying a bokeh effect to the first image acquired from the image sensor 316 of the first camera module 310 based on the depth information. For example, the bokeh application module 346 may acquire depth information from the depth measurement module 344 and may apply the bokeh effect to a partial area of the first image based on the depth information. The bokeh effect may refer to an image effect that increases a sense of depth in an image by performing a blur or out-focusing process on a partial area of the image. The application of the bokeh effect will be described later with reference to FIG. 8.

Figure 4:
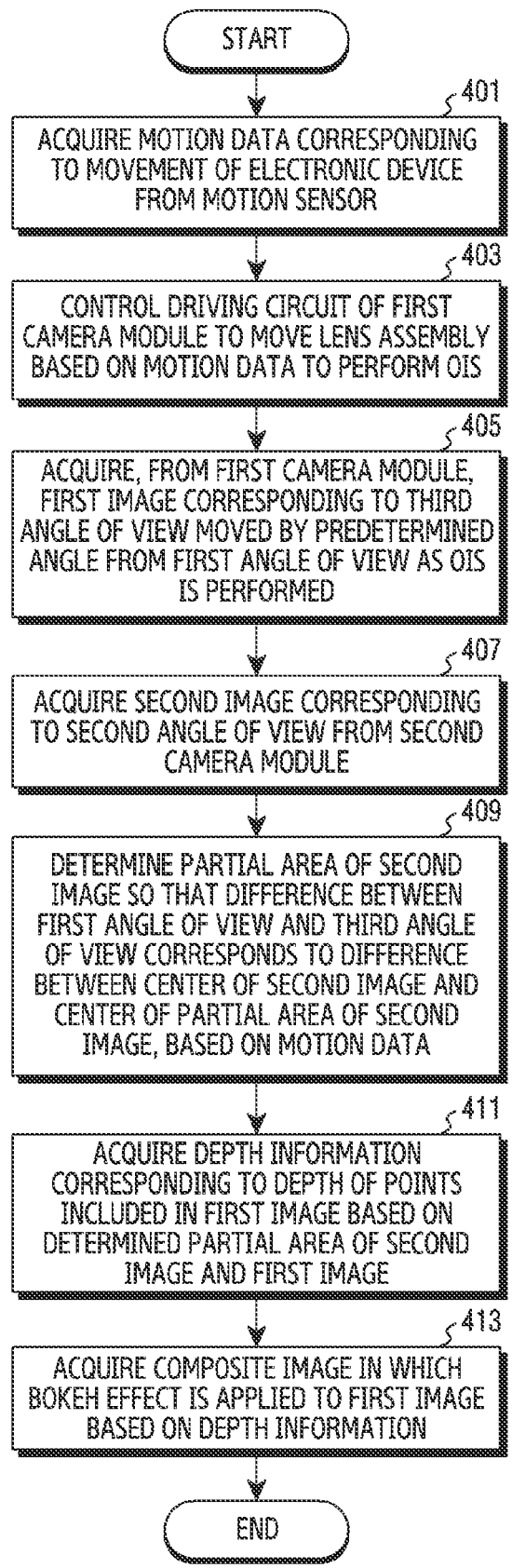
FIG. 4 is a flowchart illustrating an operation of applying a bokeh effect by an electronic device according to an embodiment.

FIG. 4 is a flowchart illustrating an operation of applying a bokeh effect by the electronic device 101 according to an embodiment. The operations illustrated in FIG. 4 may be performed by the electronic device 101 of FIG. 1 (e.g., the processor 120 of FIG. 1) or the processor 340 of FIG. 3.

According to an embodiment, in operation 401, the processor 340 may acquire motion data corresponding to the movement of the electronic device 101 from the motion sensor 330.

The OIS control circuit 342 may acquire motion data corresponding to the movement of the electronic device 101 from the motion sensor 330. The OIS control circuit 342 may provide the motion data to the driving circuit 314 of the first camera module 310 and may also provide the motion data to the AP. For example, the operation of the OIS control circuit 342 providing the motion data to the driving circuit 314 may be associated with operation 403. In addition, the operation of the OIS control circuit 342 providing the motion data to the AP (e.g., the depth measurement module 344) may be associated with operation 409.

The processor 340 may acquire the motion data from the motion sensor 330, and may acquire angle data (or target signal) corresponding to an angle at which the electronic device 101 moves based on the motion data. For example, the OIS control circuit 342 may acquire the angle data based on the motion data. The processor 340 (e.g., the OIS control circuit 342) may acquire the angle data corresponding to the angle at which the electronic device 101 moves by performing a designated operation on the motion data. For example, the processor 340 may acquire the angle data through at least some of DC-cut filter, phase compensation, integral operation, extreme value operation, multi-filter, and gain operation on motion data to be performed on the motion data.

According to an embodiment, in operation 403, the processor 340 may control the driving circuit 314 of the first camera module 310 to move the lens assembly 312 based on the motion data to perform OIS.

The processor 340 (e.g., the OIS control circuit 342) may control the first camera module 310 to perform OIS based on the motion data acquired from the motion sensor 330. For example, the processor 340 may provide the motion data to the driving circuit 314, and may control the driving circuit 314 to move the lens assembly 312 based on the motion data. The processor 340 (e.g., the OIS control circuit 342) may transmit the angle data acquired based on the motion data to the driving circuit 314 of the first camera module 310 to control the first camera module 310 to perform OIS.

According to an embodiment, in operation 405, the processor 340 may acquire, from the first camera module 310, a first image corresponding to a third angle of view moved by an angle from a first angle of view as OIS is performed.

The first angle of view may refer to an angle of view of the first camera module 310 when the lens assembly 312 of the first camera module 310 is positioned at a reference position. The reference position may refer to a center within a range in which the lens assembly 312 can move in a direction substantially perpendicular to an optical axis in the housing of the first camera module 310.

According to an embodiment, in operation 407, the processor 340 may acquire a second image corresponding to a second angle of view from the second camera module 320.

The second angle of view may be wider than or equal to the first angle of view. For example, the first camera module 310 may have a narrower angle of view than that of the second camera module 320.

According to an embodiment, in operation 409, the processor 340 may correct a difference between the first angle of view and the third angle of view by correcting the second image based on the motion data. The processor 340 may determine a partial area of the second image that satisfies a designated condition based on the motion data. According to an embodiment, based on the motion data, the processor 340 may determine the partial area of the second image so that the difference between the first angle of view and the third angle of view corresponds to a difference between the center of the second image and the center of the partial area of the second image. Operation 409 will be described later with reference to FIG. 5.

According to an embodiment, in operation 411, the processor 340 may acquire depth information corresponding to a depth of points included in the first image based on the corrected second image and first image. The processor 340 may acquire the depth information corresponding to the depth of the points included in the first image based on the determined partial area of the second image and the first image. The depth information may refer to a depth map. The acquisition of the depth information will be described later with reference to FIGS. 6 to 7.

According to an embodiment, in operation 413, the processor 340 may acquire a composite image in which a bokeh effect is applied to the first image based on the depth information. The acquisition of the composite image will be described later with reference to FIG. 8.

The processor 340 may output the composite image acquired in operation 413 through a display (e.g., the display module 160 of FIG. 1). For example, when a camera application is being executed, the processor 340 may display the composite image as a preview image on the display. As another example, the processor 340 may display the composite image on the display even when a gallery application is being executed.

The processor 340 may determine the partial area of the second image in operation 409 based on the motion data acquired from the motion sensor 330. For example, the processor 340 may calculate an angle at which the angle of view of the first camera module 310 moves (or an angle at which the lens assembly 312 moves) based on the angle data described in operation 401, and may determine the partial area based on the calculated information. When the electronic device 101 acquires the depth information based on the motion data, a data transmission path may be simplified or data processing speed may be increased compared to a case in which the depth information is acquired by measuring an amount in which the lens assembly 312 actually moves. For example, compared to a case in which the depth information is acquired by measuring the amount (i.e., an amount of the movement of OIS) in which the lens assembly actually moves through a Hall sensor included in the first camera module, in a case in which the processor 340 of the disclosure acquires the depth information based on the motion data acquired from the motion sensor 330, the latency may be reduced.

FIG. 5 is a diagram illustrating an example in which the electronic device 101 determines partial areas 524a and 524b of a second image 522 based on motion data according to an embodiment.

The first camera module 310 has a first angle of view, which is completely within an angle of view of the second camera module 320 (second angle of view). Based on movement information from the motion sensor, the processor controls a driving circuit to shift the lens assembly, thereby resulting in a change in the angle of view of the first camera module 320 by a disparity 50, thereby resulting in a third angle of view.

Referring to reference numeral 500 of FIG. 5, the first camera module 310 may have a first angle of view 510 when the lens assembly 312 is positioned at a reference position, and the second camera module 320 may have a second angle of view 520 wider than or equal to the first angle of view 510. For example, the first camera module 310 may be a wide camera, and the second camera module 320 may be an ultra-wide camera. The first angle of view 510 may be included in an area corresponding to the second angle of view 520. For example, a subject included in the first angle of view 510 may be included in the second angle of view 520, and some of the subjects included in the second angle of view 520 may not be included in the first angle of view 510.

The processor 340 may acquire an image 501 corresponding to the first angle of view 510 through the first camera module 310. The processor 340 may acquire an image 502 corresponding to the second angle of view 520 through the second camera module 320. The image 501 may be referred to as a wide image, and the image 502 may be referred to as an ultra-wide image.

The processor 340 may determine a partial area 503 of the image 502 corresponding to the second angle of view 520. In an embodiment, when the image 501 corresponding to the first angle of view 510 and the image 502 corresponding to the second angle of view 520 are acquired, the processor 340 may determine the partial area 503 with respect to the center of the image 502 corresponding to the second angle of view 520. For example, when the lens assembly 312 of the first camera module 310 is positioned at the reference position and the image 501 corresponding to the first angle of view 510 is acquired, the processor 340 may determine the partial area 503 with respect to the center of the image 502 corresponding to the second angle of view 520 to acquire depth information.

The processor 340 may acquire depth information (e.g., a depth map) corresponding to points included in the image 501 based on the image 501 corresponding to the first angle of view 510 and the determined partial area 503. The processor 340 may acquire the depth information based on a disparity 50 between the image 501 corresponding to the first angle of view 510 and the determined partial area 503. The disparity 50 may be understood as a disparity that occurs because the first camera module 310 and the second camera module 320 are disposed at positions spaced apart from each other by a certain distance on the electronic device 101.

Referring to FIG. 5, reference numerals 500a and 500b indicate an example in which the angle of view of the first camera module 310 is changed as the first camera module 310 performs optical image stabilization (OIS).

According to an embodiment, reference numeral 500a indicates an example in which the first camera module 310 has a third angle of view 515a that is moved by an angle (e.g., 1.5 degrees) to the left (e.g., in the −x direction) from the first angle of view 510 as OIS is performed.

The processor 340 (e.g., the OIS control circuit 342) may control the driving circuit 314 of the first camera module 310 to move the lens assembly 312 based on motion data (e.g., motion data acquired from the motion sensor 330) to perform OIS. The processor 340 (e.g., the depth measurement module 344) may acquire, from the first camera module 310 (e.g., the image sensor 316), a first image 512a corresponding to the third angle of view 515a moved by an angle from the first angle of view 510 as the OIS is performed. The processor 340 (e.g., the depth measurement module 344) may acquire the second image 522 corresponding to the second angle of view 520 wider than or equal to the first angle of view 510 from the second camera module 320 (e.g., the image sensor 326). The second image 522 may correspond to the image 502 of reference numeral 500. The third angle of view 515a may be included in an area corresponding to the second angle of view 520.

The processor 340 (e.g., the depth measurement module 344) may determine the partial area 524a of the second image 522 so that a difference between the first angle of view 510 and the third angle of view 515a corresponds to a difference between the center of the second image 522 and the center of the partial area 524a of the second image based on motion data (e.g., motion data or angle data acquired from the motion sensor 330). For example, as the first camera module 310 performs OIS, the angle of view of the first camera module 310 may move from the first angle of view 510 by an arrow 52a to be changed to the third angle of view 515a. When the angle of view of the first camera module 310 is moved by the arrow 52a, the processor 340 may determine the partial area 524a with respect to a point spaced apart by a direction and distance corresponding to the arrow 52a from the center of the second image 522. For example, the processor 340 may determine the partial area 524a so that a disparity 50a between the partial area 524a of the second image 522 and the first image 512a remains constant with disparity 50 between the image 501 of reference numeral 500 and the partial area 503.

According to an embodiment, even if the angle of view is moved due to the OIS of the first camera module 310 during image capturing, the electronic device 101 may move together with the position of the partial area 524a determined within the second image 522 acquired from the second camera module 320. The electronic device 101 may compensate for the movement of the angle of view of the first camera module 310 by determining the partial area 524*a* with respect to the point moved by a predetermined distance from the center of the second image 522. Since the disparity 50*a* between the first image 512*a* acquired through the first camera module 310 and the partial area 524*a* of the second image 522 acquired through the second camera module 320 may not be affected by the movement of the angle of view of the first camera module 310, the accuracy of the depth information acquired by the processor 340 based on the first image 512*a* and the partial area 524*a* may be improved.

The processor 340 may crop the determined partial area 524*a* of the second image 522 and may acquire depth information based on the cropped image (e.g., an image corresponding to the partial area 524*a*) and the first image 512*a*. In FIG. 5, the operation of determining the partial area 524*a* of the second image 522 may correspond to an operation of acquiring an image corresponding to the partial area 524*a* by cropping the second image 522.

According to an embodiment, reference numeral 500*b* indicates an example of a case in which the first camera module 310 has a third angle of view 515*b* moved by an angle (e.g., 2 degrees) to the right (e.g., +x-direction) from the first angle of view 510 as OIS is performed. The description of the third angle of view 515*a*, the first image 512*a*, the partial area 524*a* of the second image 522, the arrow 52*a*, and the disparity 50*a* which has been made with reference to reference numeral 500*a* may be applied to the third angle of view 515*b*, the first image 512*b*, the partial area 524*b* of the second image 522, the arrow 52*b*, and the disparity 50*b* which have been described with reference to reference numeral 500*b*. For example, when the first camera module 310 has the third angle of view 515*b* moved by the arrow 52*b* from the first angle of view 510, the processor 340 (e.g., the depth measurement module 344) may determine the partial area 524*b* with respect to a point spaced apart from the center of the second image 522 to correspond to the arrow 52*b*. The disparity 50*b* between the first image 512*b* and the partial area 524*b* of the second image 522 may be the same as the disparity 50 of reference numeral 500.

According to an embodiment, in FIG. 5, a case in which the first camera module 510 has the third angle of view 515*a* or 515*b* moved in the horizontal direction (e.g., x-axis direction) as OIS is performed is illustrated, but this is an example and certain embodiments that can be implemented by those skilled in the art are possible. For example, even in a case in which the first camera module 310 has a third angle of view (not illustrated) obtained by moving the angle of view of the first camera module 310 by an angle in an upward direction (e.g., +y) or downward (e.g., −y direction) from the first angle of view 510, the processor 340 may determine a partial area (not illustrated) of the second image 522 so that the disparity 50 may be constantly maintained.

According to another embodiment, even when the first camera module 310 has a third angle of view (not illustrated) obtained by moving the first angle of view 510 by an angle in the horizontal direction (e.g., the x-axis direction) and the vertical direction (e.g., the y-axis direction) as OIS is performed, the processor 340 may determine the partial area (not illustrated) of the second image 522 so that the disparity 50 may be constantly maintained.

According to an embodiment, reference numeral 500 may be understood to indicate a case in which the first camera module 310 does not perform OIS, but may also be understood to indicate a case in which the lens assembly 312 is positioned at the reference position while the first camera module 310 performs OIS so that the third angle of view coincides with the first angle of view 510. According to an embodiment, when the lens assembly 312 is positioned at the reference position and the third angle of view coincides with the first angle of view 510 upon the acquisition of the first image, the processor 340 may determine a partial area (e.g., the partial area 503) of the second image with respect to the center of the second image (e.g., the image 502) and may acquire the depth information based on the first image (e.g., the image 501) and the determined partial area.

FIG. 6 is a diagram illustrating an example in which the electronic device 101 acquires depth information 610 based on the first image 512*a* and the partial area 524*a* of the second image 522 according to an embodiment.

The processor 340 (e.g., the depth measurement module 344) may determine the partial area 524*a* of the second images 522 based on motion data, and may then acquire depth information corresponding to a depth of points included in the first image 512*a* based on the determined partial area 524*a* and the first image 512*a*. For example, the depth information may be a depth map.

The processor 340 (e.g., the depth measurement module 344) may acquire depth information 610 based on the disparity 50*a* between the determined partial area 524*a* of the second image 522 and the first image 512*a*. The disparity may be a disparity that physically occurs by a difference in positions in which the first camera module 310 and the second camera module 320 are disposed.

Referring to FIG. 6, the first image 512*a* may include a first subject 601, and the partial area 524*a* of the second image 522 may also include the first subject 601. The processor 340 may acquire first position information corresponding to the position of the first subject 601 on the first image 512*a* and second position information corresponding to the position of the first subject 601 on the partial area 524*a* of the second image 522, and may determine the depth of the first subject 601 based on the first position information and the second position information. A specific operation of determining the depth will be described later with reference to FIG. 7.

Referring to FIG. 6, the depth information 610 may include a depth of points included in the first image 512*a*. The depth of the points included in the first image 512*a* may refer to a distance between the subjects included in the first image 512*a* and the electronic device 101 (or the first camera module 310). For example, the depth information 610 may include information on a distance between the first subject 601 and the electronic device 101.

Figure 7:
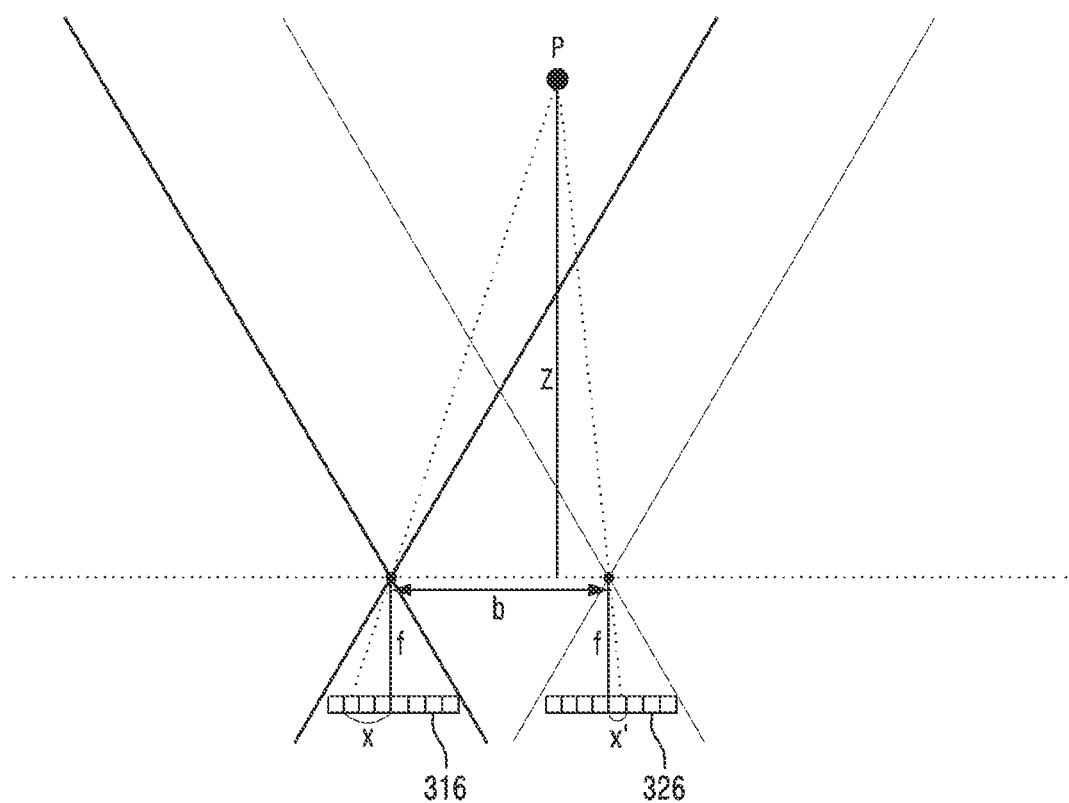
FIG. 7 is a diagram illustrating an example of a method in which an electronic device acquires depth information based on a disparity between a first image and a partial area of a second image according to an embodiment.

FIG. 7 is a diagram illustrating an example of a method in which the electronic device 101 acquires depth information 610 based on the disparity 50*a* between the first image 512*a* and the partial area 524*a* of the second image 522 according to an embodiment. In FIG. 7, as one example of a method in which the processor 340 acquires the depth information 610 using two images having the disparity 50*a* (e.g., the first image 512*a* and the partial area 524*a* of the second image), certain embodiments that can be implemented by those skilled in the art are possible in addition to method described in FIG. 7.

Referring to FIG. 7, P denotes an arbitrary object, z denotes a depth of the object P, b denotes a baseline of the first camera module 310 and the second camera module 320, f denotes a focal length, x denotes a distance between the center of the first image sensor 316 and a position of an image in which the object P is formed on the first image sensor 316, and x' denotes a distance between the center of the second image sensor 326 and a position of an image in which the object P is formed on the second image sensor 326.

The processor 340 (e.g., the depth measurement module 344) may acquire the depth of the object P using Equation 1.

$$z = \frac{bf}{d} \qquad \text{[Equation 1]}$$

According to an embodiment, d in Equation 1 denotes a disparity which is a difference between x and x'. Referring to Equation 1, the processor 340 may acquire the depth z of the object P based on the baseline b, the focal length f, and the disparity d. That is, the processor 340 may analyze two images with a disparity to determine depths of objects included in the images.

The processor 340 (e.g., the depth measurement module 344) may acquire the disparity d based on a position where an image of an object (e.g., the first subject 601) is formed on the first image 512a and a position where the image of the object (e.g., the first subject 601) is formed on the partial area 524a of the second image. The processor 340 may acquire a distance between the object (e.g., the first subject 601) and the electronic device 101 based on the focal length f of the first camera module 310, the focal length f of the second camera module 320, the baseline b of the first camera module 310 and the second camera module 320, and the acquired disparity d. The processor 340 may acquire the depth information 610 (e.g., the depth map) by measuring a distance, i.e., a depth from the electronic device 101 for each point included in the first image 512a.

Figure 8:
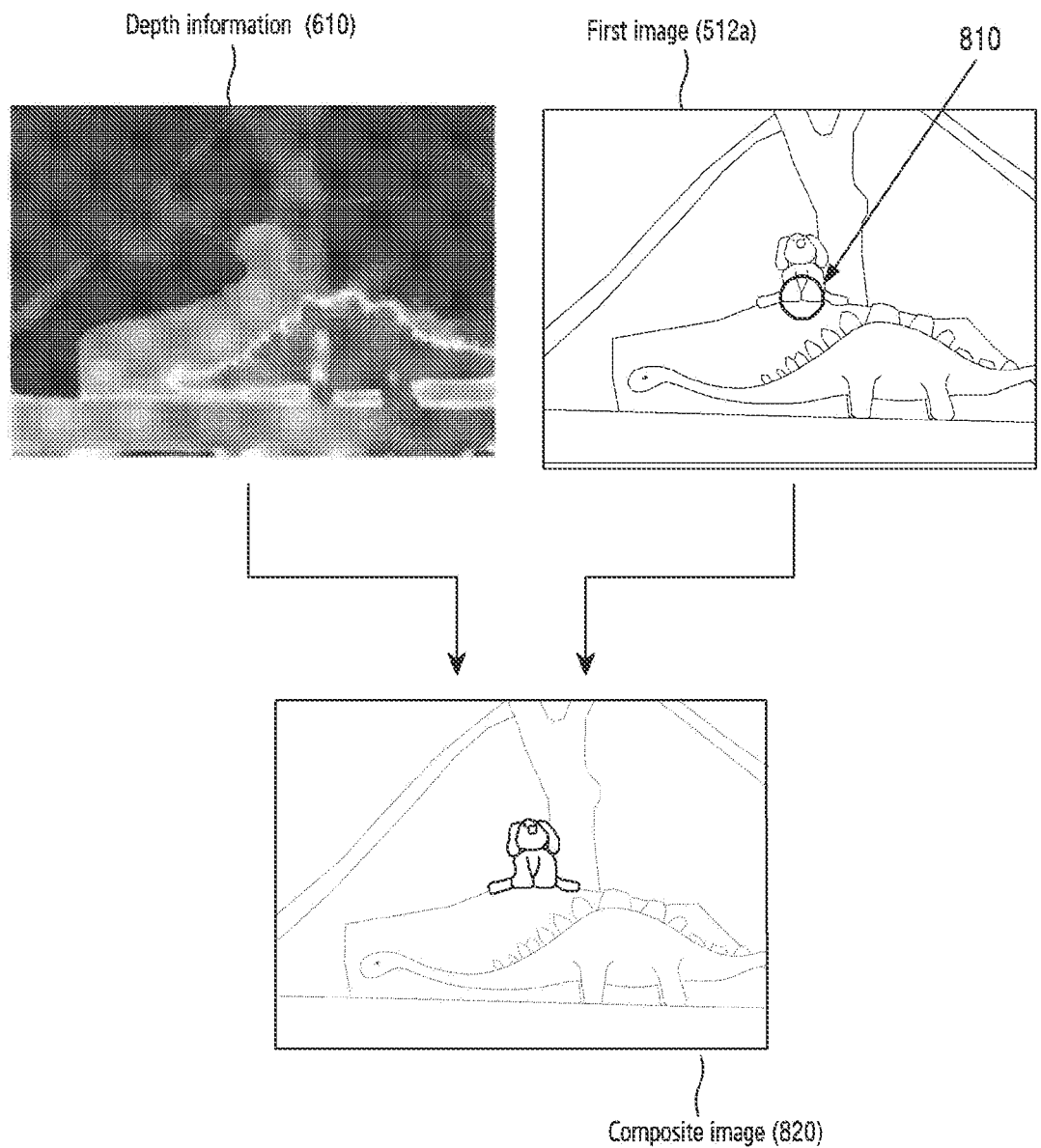
FIG. 8 illustrates an example of a composite image obtained by an electronic device based on depth information and a first image according to an embodiment.

FIG. 8 illustrates an example of a composite image 820 obtained by the electronic device 101 based on the depth information 610 and the first image 512a according to an embodiment.

The processor 340 (e.g., the bokeh application module 346) may acquire a composite image 820 in which a bokeh effect is applied to the first image 512a based on the depth information 610. For example, the bokeh application module 346 may acquire the first image 512a and the depth information 610 from the depth measurement module 344. The bokeh application module 346 may apply the bokeh effect to a portion of the first image 512a.

The processor 340 (e.g., the bokeh application module 346) may determine a region of interest (ROI) 810 of the first image 512a, and may apply the bokeh effect to at least a portion of an area excluding the ROI 810 of the first image 512a based on the depth information 610. For example, the processor 340 may determine a main subject among subjects included in the first image 512a, and may determine an area corresponding to the main subject as the ROI 810. As another example, the processor 340 may receive a user input and may determine an area of the first image 512a selected by the user as the ROI 810 based on the user input. The processor 340 may acquire the composite image 820 in which the bokeh effect is applied to all or a portion of the first image 512a except for the ROI 810. The processor 340 may identify the depth of the ROI 810 by using the depth information 610, and may not apply the bokeh effect to an area having a depth that is less than or equal to a predetermined range based on the depth of the ROI 810 and may apply the bokeh effect to an area having a depth exceeding the predetermined range based on the depth of the ROI 810.

According to an embodiment of the disclosure, the electronic device 101 may include a motion sensor 330, a first camera module 310 including a lens assembly 312 and a driving circuit 314 configured to move the lens assembly 312 in a direction substantially perpendicular to an optical axis, the first camera module having a first angle of view when the lens assembly 312 is positioned in a reference position, a second camera module 320 having a second angle of view, wherein the first angle of view is entirely within the second angle of view, and at least one processor 340 electrically connected to the motion sensor, the first camera module, and the second camera module. The at least one processor may be configured to control the driving circuit to move the lens assembly based on motion data received from the motion sensor, thereby causing the first camera module to have a third angle of view, offset from the first angle of view by an angle, acquire, from the first camera module, a first image 512a or 512b corresponding to a third angle, acquire a second image 522 corresponding to the second angle of view from the second camera module, acquire depth information 610 for the first image based on the second image and the motion data, and apply a bokeh effect to the first image based on the depth information.

In the electronic device 101 according to an embodiment, the at least one processor may be configured to: based on the motion data, determine a partial area 524a or 524b of the second image so that a difference between the first angle of view and the third angle of view corresponds to a difference between a center of the second image and a center of the partial area of the second image, and to acquire the depth information based on the partial area of the second image and the first image.

In the electronic device 101 according to an embodiment, the at least one processor may include an OSI control circuit 342 and an application processor (AP), and the OIS control circuit may acquire the motion data from the motion sensor, provide the motion data to the driving circuit to control the first camera module, and provide the motion data to the AP.

In the electronic device 101 according to an embodiment, the OIS control circuit may acquire angle data corresponding to an angle at which the electronic device moves based on the motion data acquired from the motion sensor, and may provide the angle data to the driving circuit.

In the electronic device 101 according to an embodiment, when the lens assembly is positioned in the reference position when acquiring the first image, the at least one processor may be configured to determine the partial area of the second image with respect to the center of the second image.

In the electronic device 101 according to an embodiment, the at least one processor may be configured to acquire the depth information based on a disparity 50a or 50b between the partial area of the second image and the first image.

In the electronic device 101 according to an embodiment, the partial area of the second image and the first image may include a first subject 601, and the at least one processor may be configured to acquire first position information corresponding to a position of the first subject on the first image, to acquire second position information corresponding to the position of the first subject on the partial area of the second image, and to determine a depth of the first subject based on the first position information and the second position information.

In the electronic device 101 according to an embodiment, the at least one processor may be configured to crop the partial area of the second image, thereby resulting in a cropped image, and to acquire the depth information based on the cropped image and the first image.

In the electronic device 101 according to an embodiment, the at least one processor may be configured to determine a region of interest (ROI) 810 of the first image based on the depth information and to apply the bokeh effect to at least a portion of an area of the first image excluding the ROI.

A method of operating an electronic device 101 according to an embodiment may include moving a lens assembly 312 included in the first camera module in a direction substantially perpendicular to an optical axis based on motion data form a motion sensor, thereby causing the first camera to offset from having a first angle of view to a third angle of view, acquiring a first image 512a or 512b corresponding to a third angle of view, acquiring a second image 522 corresponding to a second angle of view, wherein the first angle of view is entirely within the second angle of view through a second camera module 320 included in the electronic device, acquiring depth information 610 for the first image based on the second image and the motion data, and applying a bokeh effect to the first image based on the depth information.

In the method of operating the electronic device 101 according to an embodiment, the method may include, based on the motion data, determining a partial area of the second image so that a difference between the first angle of view and the third angle of view corresponds to a difference between a center of the second image and a center of the partial area 524a or 524b of the second image, and acquiring the depth information based on the partial area of the second image and the first image.

The method of operating the electronic device 101 according to an embodiment may further include determining data corresponding to the angle at which lens assembly moves based on the motion data.

In the method of operating the electronic device 101 according to an embodiment, when the lens assembly is positioned in the reference position when acquiring first image, determining of the partial area of the second image may include determining the partial area of the second image with respect to the center of the second image.

In the method of operating the electronic device 101 according to an embodiment, acquiring of the depth information may include acquiring the depth information based on a disparity 50a or 50b between the partial area of the second image and the first image.

In the method of operating the electronic device 101 according to an embodiment, acquiring of the depth information based on the disparity may include acquiring first position information corresponding to a position of a first subject 601 on the first image, acquiring second position information corresponding to the position of the first subject on the partial area of the second image, and determining a depth of the first subject based on the first position information and the second position information.

The electronic device 101 according to an embodiment may include a motion sensor 330, a first camera module 310 including a lens assembly 312 and a driving circuit 314 configured to move the lens assembly in a direction substantially perpendicular to an optical axis and to have a first angle of view when the lens assembly is positioned in a reference position, a second camera module 320 configured having a second angle of view wider than or equal to the first angle of view, and at least one processor 340 electrically connected to the motion sensor, the first camera module, and the second camera module. The at least one processor may be configured to control the driving circuit to move the lens assembly based on motion data from the motion sensor, acquire, from the first camera module, a first image 512a or 512b corresponding to a third angle of view moved by an angle from the first angle of view, acquire a second image 522 corresponding to the second angle of view from the second camera module, to determine a partial area 524a or 524b of the second image satisfying a designated condition based on the motion data, to acquire depth information 610 corresponding to a depth of points included in the first image based on the partial area of the second image and the first image, and to applying a bokeh effect to the first image based on the depth information.

In the electronic device 101 according to an embodiment, the at least one processor may be configured to acquire angle data corresponding to an angle at which the electronic device moves based on the motion data, providing the angle data to the driving circuit, and to determine the partial area of the second image based on the angle data.

In the electronic device 101 according to an embodiment, the at least one processor may be configured to acquire the depth information based on a disparity 50a or 50b between the partial area of the second image and the first image.

In the electronic device 101 according to an embodiment, the at least one processor may be configured to acquire first position information corresponding to a position of a first subject 601 on the first image, to acquire second position information corresponding to the position of the first subject on the partial area of the second image, and to determine a depth of the first subject based on a disparity between the first position information and the second position information.

In the electronic device 101 according to an embodiment, the depth of the first subject may be a distance between the first subject and the electronic device.

Although the foregoing embodiments have been presented with a degree of particularity, it shall be understood that the foregoing embodiments can subject to revisions, modifications, and substitution, omission, and addition of elements, without departing from the spirit and scope of this disclosure.

What is claimed is:
1. An electronic device comprising:
a motion sensor;
a first camera module including a lens assembly and a driving circuit configured to move the lens assembly in a direction substantially perpendicular to an optical axis, the first camera module having a first angle of view when the lens assembly is positioned in a reference position;
a second camera module having a second angle of view, wherein the first angle of view is entirely in the second angle of view; and
at least one processor electrically connected to the motion sensor, the first camera module, and the second camera module,
wherein the at least one processor is configured to:
control the driving circuit to move the lens assembly based on motion data received from the motion sensor, thereby causing the first camera module to have a third angle of view, offset from the first angle of view by an angle,
acquire, from the first camera module, a first image corresponding to the third angle of view,
acquire a second image corresponding to the second angle of view from the second camera module,
acquire depth information for the first image based on the second image and the motion data, and apply a bokeh effect to the first image based on the depth information.

2. The electronic device of claim 1, wherein the at least one processor is configured to:
based on the motion data, determine a partial area of the second image so that a difference between the first angle of view and the third angle of view corresponds to a difference between a center of the second image and a center of the partial area of the second image, and acquire the depth information based on the partial area of the second image and the first image.

3. The electronic device of claim 1, wherein
the at least one processor includes an optical image stabilization (OSI) control circuit and an application processor (AP), and
wherein the OIS control circuit is configured to:
acquires the motion data from the motion sensor,
provides the motion data to the driving circuit, and
provides the motion data to the AP.

4. The electronic device of claim 3, wherein
the OIS control circuit is configured to:
acquires angle data corresponding to an angle at which the electronic device moves based on the motion data acquired from the motion sensor, and
provides the angle data to the driving circuit.

5. The electronic device of claim 2, wherein, when the lens assembly is positioned in the reference position when acquiring the first image, the at least one processor is configured to determine the partial area of the second image with respect to the center of the second image.

6. The electronic device of claim 2, wherein the at least one processor is configured to acquire the depth information based on a disparity between the partial area of the second image and the first image.

7. The electronic device of claim 6, wherein
the partial area of the second image and the first image include a first subject, and
the at least one processor is configured to:
acquire first position information corresponding to a position of the first subject on the first image,
acquire second position information corresponding to the position of the first subject on the partial area of the second image, and
determine a depth of the first subject based on the first position information and the second position information.

8. The electronic device of claim 2, wherein the at least one processor is configured to:
crop the partial area of the second image, thereby resulting in a cropped image, and
acquire the depth information based on the cropped image and the first image.

9. The electronic device of claim 1, wherein the at least one processor is configured to:
determine a region of interest (ROI) of the first image based on the depth information, and
apply the bokeh effect to at least a portion of an area of the first image excluding the ROI.

10. A method of operating an electronic device, the method comprising:
moving a lens assembly included in a first camera module in a direction substantially perpendicular to an optical axis based on motion data from a motion sensor, thereby causing the first camera module to offset from having a first angle of view by angle to a third angle of view;
acquiring a first image corresponding to a third angle of view;
acquiring a second image corresponding to a second angle of view, wherein the first angle of view is entirely within the second angle of view, through a second camera module;
acquiring depth information for the first image based on the second image and the motion data; and
applying a bokeh effect to the first image based on the depth information.

11. The method of claim 10, further comprising:
based on the motion data, determining a partial area of the second image so that a difference between the first angle of view and the third angle of view corresponds to a difference between a center of the second image and a center of the partial area of the second image; and
acquiring the depth information based on the partial area of the second image and the first image.

12. The method of claim 10, further comprising:
determining data corresponding to the angle at which the lens assembly of the first camera module moves based on the motion data.

13. The method of claim 11, wherein, when the lens assembly is positioned in a reference position when acquiring the first image, determining of the partial area of the second image includes determining the partial area of the second image with respect to the center of the second image.

14. The method of claim 11, wherein acquiring of the depth information includes acquiring the depth information based on a disparity between the partial area of the second image and the first image.

15. The method of claim 14, wherein acquiring of the depth information based on the disparity includes:
acquiring first position information corresponding to a position of a first subject on the first image;
acquiring second position information corresponding to the position of the first subject on the partial area of the second image; and
determining a depth of the first subject based on the first position information and the second position information.

16. An electronic device comprising:
a motion sensor;
a first camera module including a lens assembly and a driving circuit configured to move the lens assembly in a direction substantially perpendicular to an optical axis and to have a first angle of view when the lens assembly is positioned in a reference position;
a second camera module having a second angle of view wider than or equal to the first angle of view; and
at least one processor electrically connected to the motion sensor, the first camera module, and the second camera module,
wherein the at least one processor is configured to:
control the driving circuit to move the lens assembly based on motion data from the motion sensor,
acquire, from the first camera module, a first image corresponding to a third angle of view moved by an angle from the first angle of view,
acquire a second image corresponding to the second angle of view from the second camera module,
determine a partial area of the second image satisfying a designated condition based on the motion data,
acquire depth information corresponding to a depth of points included in the first image based on the partial area of the second image and the first image, and applying a bokeh effect to the first image based on the depth information.

17. The electronic device of claim 16, wherein the at least one processor is configured to:
acquire angle data corresponding to an angle at which the electronic device moves based on the motion data,
providing the angle data to the driving circuit, and
determine the partial area of the second image based on the angle data.

18. The electronic device of claim 16, wherein the at least one processor is configured to acquire the depth information based on a disparity between the partial area of the second image and the first image.

19. The electronic device of claim 18, wherein the at least one processor is configured to:
acquire first position information corresponding to a position of a first subject on the first image,
acquire second position information corresponding to the position of the first subject on the partial area of the second image, and
determine a depth of the first subject based on a disparity between the first position information and the second position information.

20. The electronic device of claim 19, wherein the depth of the first subject is a distance between the first subject and the electronic device.

* * * * *